Figure 1:
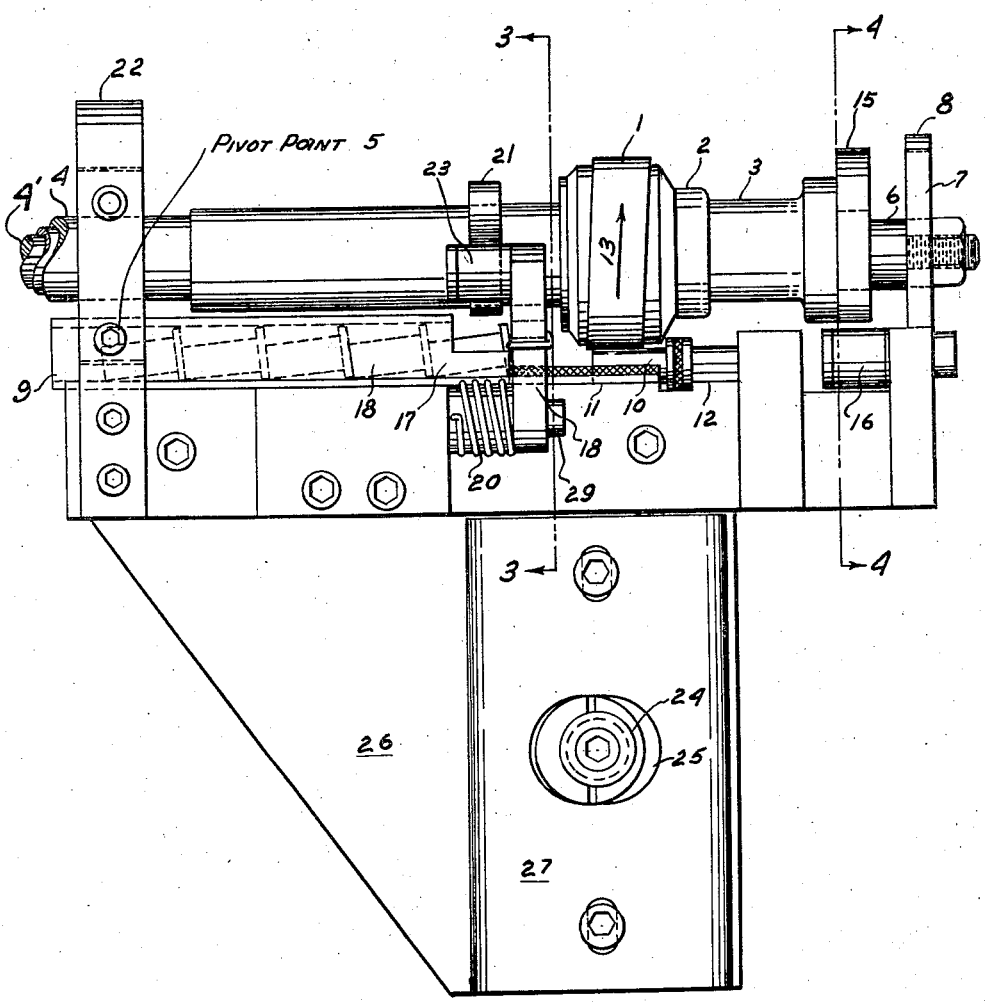

Sept. 24, 1946.   S. C. HURLEY, JR   2,408,170
DEVICE FOR ROTATING ROUNDS
Filed Oct. 2, 1944   2 Sheets-Sheet 1

INVENTOR.
SAMUEL C. HURLEY, JR.
BY Benedict & Swartwood
ATTORNEYS

Sept. 24, 1946.  S. C. HURLEY, JR  2,408,170
DEVICE FOR ROTATING ROUNDS
Filed Oct. 2, 1944  2 Sheets-Sheet 2

INVENTOR.
SAMUEL C. HURLEY, JR.
BY Benedict & Swartwood
ATTORNEYS

Patented Sept. 24, 1946

2,408,170

UNITED STATES PATENT OFFICE 2,408,170

DEVICE FOR ROTATING ROUNDS

Samuel C. Hurley, Jr., Danville, Ill.

Application October 2, 1944, Serial No. 556,811

3 Claims. (Cl. 214—1)

This application is a continuation in part of my copending application 545,360, filed July 17, 1944.

This invention relates to a device for feeding, rotating, and monitoring articles in a unit operation device and is particularly useful for the scanning of rounds by rotating the round in a photoelectric inspection zone. The amount of rotation depends on the type of inspection desired and may vary from a number of complete revolutions of the round to a fraction of a revolution of the round during the time the round is in the inspection zone.

One of the objects of my invention is to provide a novel apparatus for spinning the rounds in an inspection zone and for maintaining only one round at a time in the inspection zone and for removing the round inspected and placing the next round in inspection position.

Another object of my invention is to provide an apparatus particularly useful in photoelectrically scanning a round at a given point. The particular method and apparatus for obtaining the photoelectric inspection is fully described in my copending application 545,360. Thus, the photoelectric inspection may be accomplished by spinning the round against a stop or block; and by suitable arrangement of a light beam and a light sensitive device, the circumference of a round may be scanned. Some of the specific inspections for which my apparatus is particularly useful are the following:

1. Diameter.
2. Length.
3. Bevel.
4. Curvature.
5. Alignment.
6. Parallelism.
7. Internal round surfaces for eccentricity and concentricity.
8. External surface of rounds for eccentricity and concentricity.
9. Irregularities in surface such as flat spots, depressions, ridges, etc.
10. To determine the location, shape, and size of different parts of segments such as slots, grooves, scratches, threads.
11. To determine whether a piece is true, e. g. whether the end of a cylinder is at right angles with the longitudinal dimension.
12. Angle.
13. Major diameter, pitch diameter, angle, lead, etc., of threads.

By a round, I mean any object which has any bearing surface which is round and by way of example, the following are given to indicate the various kinds of rounds that may be inspected by my device:

1. Pins
2. Tubes
3. Rivets
4. Tops
5. Bullet shaped
6. Spools
7. Hour glass shapes
8. Cones
9. Ellipsoids
10. Truncated cylinders and cones
11. Barrel shaped
12. Paraboloids
13. Cylinders
14. Spheres
15. Screws
16. Threads
17. Bolts The previous photoelectric inspection methods for determining shapes and dimensions, etc., of a round do not involve scanning the round by rotating it at an inspection point and therefore inaccuracies in the inspection are unavoidable. By my method, the circumference of a round may be inspected and therefore I have provided an improved, accurate, and speedy method for inspection of rounds.

Another object of my invention is to provide an improved monitoring means and means for rotating a round in the inspection zone, particularly for inspecting small round objects of less than a quarter of an inch in diameter. While it is comparatively easy to inspect large objects, it has been found difficult to provide a suitable apparatus for inspecting small objects, particularly small rounds having flanges, bevels, etc. By my device, I have overcome these difficulties.

Another advantage of my invention is in the means that I provide for maintaining the round against the stop during the rotation. It is obvious that if the round is not rotated solidly against the stop, it may chatter or bounce against the stop and cause inaccuracies in the inspection. I prevent this by providing the proper angle on the rotating means as will be hereinafter fully described.

Broadly, my invention comprises means for continuously feeding a round to an inspection zone, a monitoring means for maintaining only one round at a time in the inspection zone, and means for rotating the round while it is in the inspection zone.

More specifically, my invention comprises in combination an assembly comprising a rotation means including a rotatable shaft and a roller attached to said shaft, a feedway associated therewith, a first camming means attached to said shaft to periodically raise the rotation means to permit the round to be ejected from the inspection zone, a monitoring means associated with said feedway to maintain only one round at a time in the inspection zone and to release the next round to the inspection zone after the inspection of the previous round is finished and the monitoring means actuated by a second cam on the rotatable shaft synchronized with the first cam.

Figure 2:
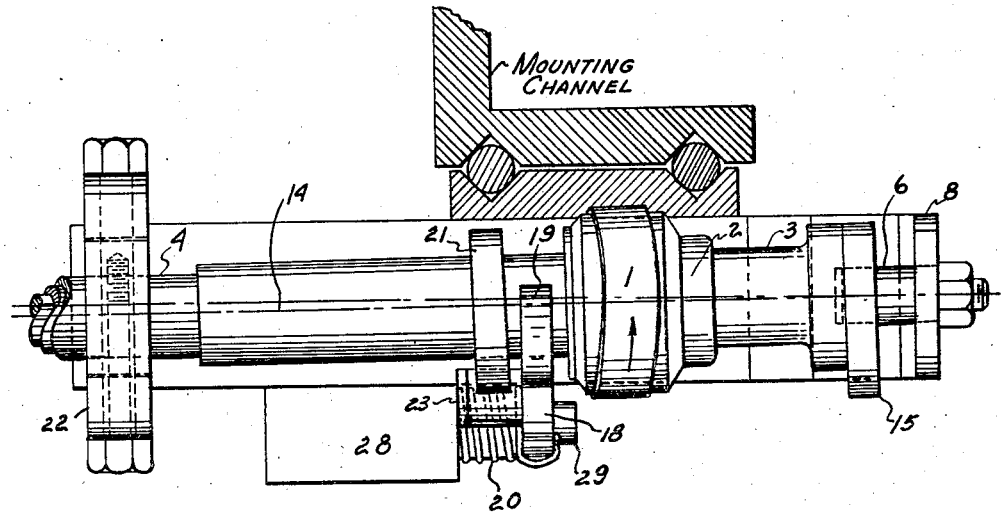
Figures 3, 4:
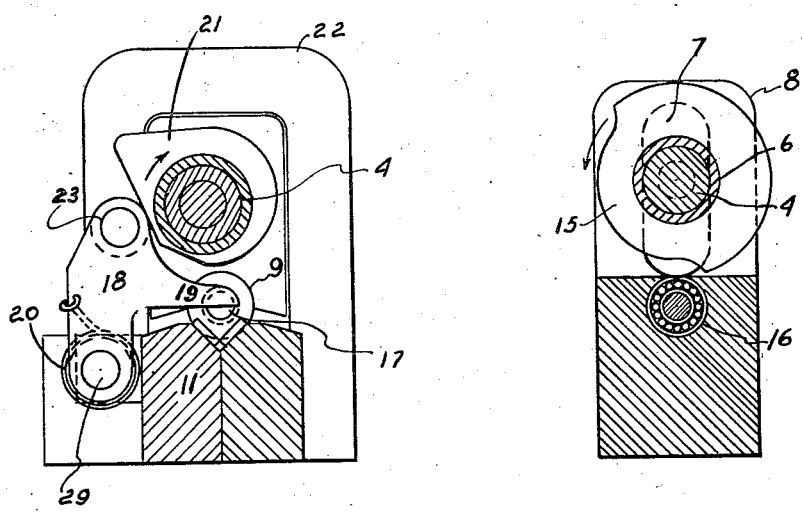

Other embodiments, advantages, objects, uses, and applications of my invention will become apparent by referring to the drawings in which Fig. 1 shows an elevation of the entire assembly; Fig. 2 shows a plan view of the assembly; Fig. 3 is a cross-section along lines 3—3 of Fig. 1 illustrating the function of the monitoring device; Fig. 4 is a cross-section along the lines 4—4 of Fig. 1 illustrating the function of the camming means for periodically raising the rotation means.

In Fig. 1, I have illustrated rounds in an inspection position which are shaped like rivets, although the apparatus may be used for any shape rounds within the scope of my invention. The inspection roller 1 which is mounted or attached to the enlarged part 2 of sleeve 3 is rotated by means of the driving shaft 4 journaled in end plate 22 which is pivotally attached at pivot point 5. The other end of the shaft at point 6 is positioned in opening 7 of the end plate 8.

The roller 1 may comprise or be surfaced with a friction means such as rubber in order to prevent slippage between the roller and the round. I have illustrated as a disengaging means between the round and the roller, a pivoted rotation means raised by a cam at the opposite end; the cam could be located near the center with the rotation means slidably attached in a slot at each end, however.

A feedway 9, shown as a feeding tube although any other suitable feeding means may be used, is provided to feed the rounds into the inspection position. The rounds may be fed to the inspection zone through the tube by mechanical means such as fluid pressure. However, it is preferable, although not essential, to incline the entire assembly at an angle of about 45° in a direction from point 4 to point 7 and the rounds fed along the feedway by gravity.

A round 10 is shown in the inspection position underneath the roller 1 and in the positioning means 11 which may be a conventional V-block. The round 10 is rotated against the stop or block 12 in V-block 11 in order to orient the round in the photoelectric inspection zone during the scanning operation. In order to insure that the round is solidly rotated against the stop 12, the roller 1 is angled slightly as illustrated and with this direction of angle, the direction of rotation is in the direction of the arrow 13. If the direction of rotation is reversed, the angle of the roller is reversed. In other words, the roller is angled such as to force the round against the stop 12.

I have also found that with this direction of rotation of the angled roller that if I angle the rotating shaft 4 from the normal center line in a transverse plane to the elevation in a direction away from the angle of rotation in the manner shown in Fig. 2 illustrated by numeral 14, the round is pressed against the stop 12 and will not chatter or bounce during rotation. The angle 14 may not be very large and usually an angle of less than 1° will be sufficient.

At the end of the inspection, it is necessary to raise the roller 1 from the round 10 in order to remove the round 10 from the inspection zone. After the roller is raised, the particular manner of removing the round 10 from the inspection zone is not material to my invention but may be removed by an air blast controlled by a solenoid valve and correlated with the photoelectric inspection. To accomplish this, I provide a cam 15 which acts against a roller bearing 16 as the shaft 4 rotates. In the drawing of Fig. 1, the cam is shown in such a position that the roller is contacting the round 10 by gravity. As the rotation continues, the upper end of the cam 15 contacts the roller bearing 16, raising the roller 1, permitting the round 10 to be ejected from the inspection zone. This is more clearly shown in Fig. 4 in which the direction of rotation of the cam 15 is shown by the arrow.

In this type of unit inspection, it is necessary that only one round at a time be maintained in the inspection zone and to provide means for feeding the rounds one at a time to the inspection zone. Furthermore, it is important to prevent the next round to be fed to the inspection zone from entering the inspection zone until the round undergoing inspection has been discharged by the air blast. Referring to Fig. 1, the next round 17 in the inspection zone is maintained in that position until the round 10 is discharged by the monitoring or trapping device 18. The trapping arm 19 blocks the feedway and is held in blocking or trapping position by means of the spring 20. The monitoring device 18 is pivoted on bearing 29. The functioning of the monitoring device is best shown by referring to Fig. 3. A second cam 21 attached to the shaft 3 acts against the arm 23 best shown in Fig. 1 and raises the trapping end 19, thus unblocking the feedway 9 and permitting the round 17, which had been previously blocked, to enter the inspection zone. The cam 21 is rotated clock-wise in the direction shown by the arrow in Fig. 3. During most of one complete revolution of the shaft 4, the blocking arm 19 is in position to trap the round 17.

The synchronization between cam 7 and cam 21 with the inspection operation is as follows: Near the end of the inspection, the cam 15 acts against the needle bearing 16 and raises the shaft 4 about the pivot 5, disengaging the roller from the round 10, permitting the round 10 to be discharged. This occurs just before the cam 21 acts against the arm 23 which raises the trap 19. As the cam 21 continues its rotation, it thrusts against the bearing 23 raising the trap 19 and permits the next round 17 to enter the inspection zone; but almost immediately, the trap 19 again comes down in position trapping the next round 18' in the feedway 9. The cam 15 continuing its rotation then lowers the inspection roller 1 onto the round 17 in order to inspect the round 17. In other words, the timing to prevent the round 17 from entering the inspection zone before round 10 is discharged, thereby preventing round 17 from being discharged along with round 10, is as follows:

1. Cam 15 raises the roller 1 permitting the round in inspection position to be discharged.

2. After the round in inspection position has been discharged, the cam 21 raises the blocking arm 19, permitting the next round to enter the inspection zone.

3. The cam 21 disengages itself from the bearing 23, permitting the spring 20 to cause the trapping arm 19 to block the feedway 9.

4. The cam 15 disengages itself from the bearing 16, permitting the roller to contact the round in the inspection zone. Thus, by providing suitable camming means and proper synchronization, I am able to accomplish the objects of my invention.

In order to provide a means for adjusting the distance between the V-block 11 and the roller 1 in order to accommodate different sized rounds and also to adjust the round 10 in the proper inspection position, I provide an adjusting cam 24 mounted in the opening 25 in the plate 27 and arranged and adapted to actuate against the plate 26 in such a manner that the V-block may be raised and lowered.

In another embodiment of my invention, the shaft 4 instead of rotating may be a journal bearing within which a rotatable shaft 4' turns. In this case, the cam 21 does not rotate but is attached to the journal bearing 4' and moves up and down thus actuating the monitoring device 18.

The above description of the illustrations is not intended to limit my invention, which is only limited by the following claims:

I claim as my invention:

1. An apparatus of the class described comprising in combination a rotatable shaft arranged and adapted to be raised and lowered, a roller attached thereto, a feed way associated therewith, a first cam attached to said shaft and adapted and arranged for periodically raising the roller, a movable trap associated with said feed way, a second cam on said shaft adapted and arranged for actuating the movable trap and said second cam synchronized with said first cam to release said trap while the roller is raised.

2. An apparatus for rotating rounds comprising in combination a rotatable shaft arranged and adapted to be raised and lowered, a roller attached thereto, a feed-way associated therewith for containing a plurality of the rounds and for feeding the rounds for rotation by the roller, a positioning means associated with said feed way and said rotation means for positioning the round during rotation by the roller, a first cam attached to said shaft and adapted and arranged for periodically raising the roller, a movable trap associated with said feed-way for feeding one round at a time for rotation by the roller, a second cam on the shaft adapted and arranged to actuate the movable trap and said second cam synchronized with said first cam to release the trap while the roller is raised due to actuation by the first cam thereby releasing one round at a time for rotation by the roller.

3. An apparatus for rotating rounds comprising in combination a rotatable shaft arranged and adapted to be raised and lowered, a roller attached thereto, a feed way associated therewith for feeding the rounds, a V-block associated with said feed way and said rotation means for positioning the round during rotation by the roller, means for adjusting the distance between the V-block and said rotation means, a first cam attached to said shaft and adapted and arranged for periodically raising the roller, a movable trap associated with said feed way for feeding one round at a time for rotation by the roller, a second cam on the shaft adapted and arranged to actuate the movable trap and said second cam synchronized with said first cam to release the trap while the roller is raised due to actuation by the first cam thereby feeding a round for rotation by the roller.

SAMUEL C. HURLEY, Jr.